United States Patent [19]

Bagchi et al.

[11] Patent Number: 5,301,055
[45] Date of Patent: Apr. 5, 1994

[54] SCHEDULER FOR MULTICAST CELL TRANSMISSION

[75] Inventors: Anindo Bagchi, Ocean; Tirunell V. Lakshman, Eatontown; Kasra Rastani, Freehold, all of N.J.

[73] Assignee: Bell Communications Research, Inc., Livingston, N.J.

[21] Appl. No.: 39,546

[22] Filed: Mar. 29, 1993

Related U.S. Application Data

[63] Continuation of Ser. No. 769,873, Oct. 1, 1991, abandoned.

[51] Int. Cl.[5] .................. H04J 14/08; H04J 14/00
[52] U.S. Cl. ........................ 359/139; 359/117; 359/128; 370/60.1; 370/94.2
[58] Field of Search ............ 359/114, 117, 118, 124, 359/125, 126, 128, 135, 137, 139, 167; 370/60, 60.1, 94.1, 94.2; 379/265, 266

[56] References Cited

U.S. PATENT DOCUMENTS

| | | | |
|---|---|---|---|
| 4,642,804 | 2/1987 | Personick | 359/114 |
| 4,731,878 | 3/1988 | Vaidya | 359/117 |
| 4,797,589 | 1/1989 | Collins | 370/63 |
| 4,821,255 | 4/1989 | Kobrinski | 359/128 |
| 4,894,818 | 1/1990 | Fujioka et al. | 359/117 |
| 4,991,168 | 2/1991 | Richards | 370/54 |
| 5,018,130 | 5/1991 | Suzuki et al. | 359/124 |
| 5,077,483 | 12/1991 | Cloonan et al. | 359/135 |
| 5,091,905 | 2/1992 | Amada | 370/60 |
| 5,119,368 | 6/1992 | Hiltner et al. | 370/112 |

OTHER PUBLICATIONS

T. T. Lee et al., "A broadband optical multicast switch," *Proceedings of the XIII International Switching Symposium*, 1990, vol. 3, pp. 7–13.

M. R. Garey et al., "A List of NP-Complete Problems," *Computers and Intractability: A Guide to the Theory of NP-Completeness*, 1979, Freeman Press, p. 191.

*Primary Examiner*—Richard E. Chilcot, Jr.
*Assistant Examiner*—Rafael Bacares
*Attorney, Agent, or Firm*—Leonard Charles Suchyta; James W. Falk

[57] ABSTRACT

A scheduler for a packet switch capable of atomic multicasts, that is, allowing one packet at an input port to be simultaneously transmitted to multiple output ports. The scheduling algorithm sequentially polls each of the input ports to determine to which output ports it desires connection for the next transmission slot. If those output ports are available, that input port assigns itself to the slot, and subsequent input ports are blocked from those output ports. The scheduling algorithm does not poll these blocked input ports for the current slot. The scheduler can be advantageously implemented in an optical system having one optical path for indexing control and multiple optical paths corresponding to each of the output ports. Sub-schedulers are arranged serially along all the optical paths. When a sub-scheduler is notified by the indexing control path that its turn to assign has arrived, it checks all of the optical paths corresponding to the output ports to which it desires connection. If those output ports are available, it assigns itself to the current slot, indicates on the output port optical paths that those desired output ports are no longer available, and indicates on the indexing control path that its assigning turn is over. If those output ports are not available, it nonetheless indicates on the indexing control path that its assigning turn is over and waits till the next assigning period.

19 Claims, 7 Drawing Sheets

SCHEDULER FOR MULTICAST CELL TRANSMISSION

This application is a continuation of application Ser. No. 07/769,873, filed Oct. 1, 1991, now abandoned.

FIELD OF THE INVENTION

The invention relates generally to communication networks. In particular, the invention relates to control of a node asynchronously switching packets of data.

BACKGROUND ART

Figure 1:
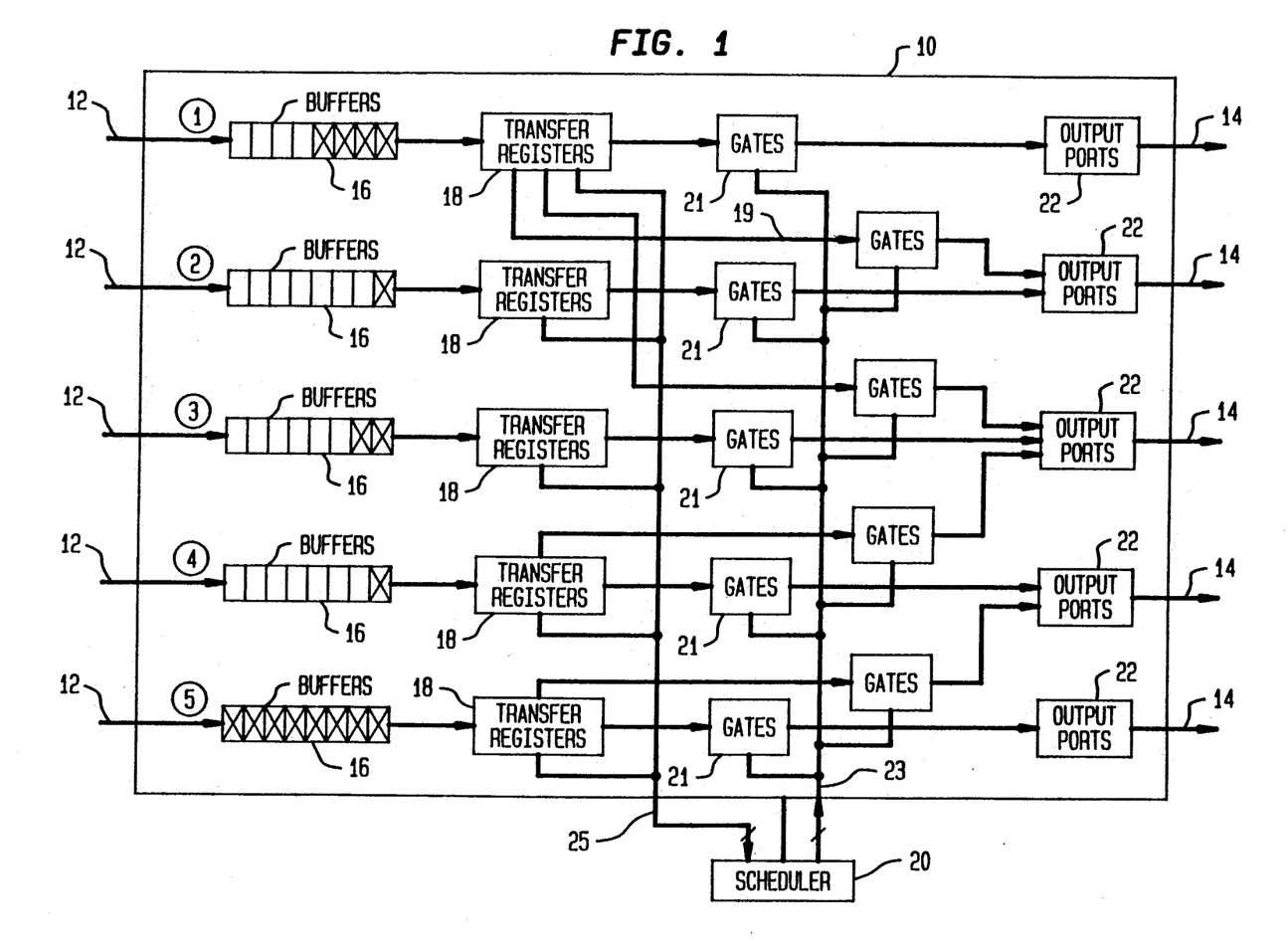
FIG. 1 is a block diagram of an ATM switch.

Communication networks are being developed which operate in the asynchronous transfer mode (ATM) in which relatively short packets of data, called cells, propagate across the network from source to destination. An ATM switch, illustrated diagrammatically in FIG. 1, is located at each node of the network and includes a switch fabric 10 which must transfer a particular cell coming from any of the input channels 12 to a selected one of multiple output channels 14. In the simple illustrated switch, data contained in the cell determine which output channel 14 is selected for that cell. The input channels 12 are not synchronized with each other, but the switch achieves synchronous operation by temporarily storing cells arriving on a particular input channel 12 in an associated input buffer 16. The filled elements of the buffers 16 are marked by X's in the figure. On the other hand, an ATM switch does not have output buffers, but the cell is transmitted as soon as it routed to the correct output channel 14.

The ATM switch performs each of a set of operations in a repetitive period called the transmission cell slot. One of the cells waiting in each of the buffers 16, usually the oldest cell in the queue, is transferred to an empty corresponding transfer register 18. In the simple and conceptual illustrated switch fabric 10, transfer channels 19 (only some of which are illustrated) extend from each of the transfer register 18 to each of multiple output ports 22. Each of the transfer channels 19 has a gate 21 controlled by a scheduler 20 through gate control lines 23. In operational systems, the physical details of the transferring mechanism may be significantly different, for example, as disclosed in the later cited reference to Lee et al. The scheduler 20 examines all the cells waiting in the transfer registers 18 through query lines 25, determines from reading the cells' destinations to which output ports 22 they should be transferred, resolves any contentions when cells in two or more transfer registers 18 should be transferred to the same output port 22, and transfers as many as possible of the cells to the proper output ports 22 consistent with the contention resolution. That is, if contention exists, not all cells are transferred and the transfer registers 18 of the unselected cells remain filled into the next transmission cell slot. Any filled output port 22 has its cell transmitted onto the associated output channel 14. In the following discussion, each transfer register 18 and its associated buffer 16 will be referred to as an input port. In the simple architecture of FIG. 1, the scheduler 20 interacts with the input ports only through the transfer registers 18.

The scheduler 20 resolves the contention so that no more than one cell is transferred to a particular output port 22 in any transmission slot. Excessive contention or poor resolution of contention will result in overflow of one or more buffers 16 and the resulting loss of cells.

Ideally, the scheduler 20 optimally schedules the transfers within time constraints imposed by the switch architecture while also incorporating priority and fairness. Additionally, it should schedule for a mixture of different types of transmission requests. The scheduler 20 needs to read the destination address in the input port.

Transmission requests can be divided into three types relevant to the scheduling problem: unicasts, non-atomic multicasts, and atomic multicasts. For unicasts, an input cell requests transmission to only one output port. For multicasts, an input cell requests transmission to at least two output ports. In a non-atomic multicast transmission, the switch may transfer the cell to multiple output ports in different transmission slots. In an atomic multicast transmission, the switch must transfer the cell to all the requested output ports in a single transmission slot. That is, the cell is either successfully transmitted to all requested output ports in that slot or it is not transmitted at all. Scheduling unicasts and non-atomic multicasts are special cases of scheduling atomic multicasts. A unicast is an atomic multicast to a single destination. A non-atomic multicast can be scheduled as a sequence of atomic multicasts to subsets of the set of requested output ports. Hence, a system capable of scheduling atomic multicasts will also have the ability to handle mixes of different types of requests.

Lee et al. have disclosed a multicasting scheduler in "A broadband optical multicast switch," *Proceedings of the XIII International Switching Symposium*, 1990, volume 3, pages 7–13. Their switch fabric involves optical wavelength-division multiplexing over a star coupler with the output ports being frequency tunable to the different input ports, but contention over output ports still requires resolution. A token is serially passed between the input ports. The token allocates for each output port an availability bit and a source address (ultimately the wavelength associated with that source). An input port examines the token. If all the output ports it needs are available, it changes the desired availability bits to indicate unavailability and writes its address into all the associated source addresses. If all the desired output ports are not available, it passes the token on unchanged. After the token has passed through all input ports, it passes to the output ports, each of which examines the source address allocated to it and which now determines the optical frequency to which it must tune for the next cell transmission cycle. Thereafter, all input ports transmit through the star coupler at their dedicated optical frequencies. Such sequential operation on both the input and output sides is considered to be too slow.

SUMMARY OF THE INVENTION

The invention can be summarized as a scheduler for switching cells operating according to an algorithm in which each input port is sequentially given the opportunity to assign itself to a time slot. If all desired output ports are available, it assigns itself to that slot and indicates that those output ports are not longer available. If not all desired output ports are available, it disables itself for the duration of the assignment cycle and relinquishes assignment control to another input port.

Large portions of the algorithm can be executed in parallel for each of the input ports so that the serially executed operations for the different input ports can be reduced to indicating unavailability and relinquishing control by those input ports that assign themselves the current slot.

The algorithm can be advantageously implemented in optical circuitry in which optical paths are formed corresponding to each of the output ports and for a control path. Scheduling circuitry implemented for each of the input ports are serially connected along the optical paths. When one input port recognizes from the control path that its turn has arrived, it examines the optical paths for all the output ports to which it desires connection to see if those output ports are available. If so, it impresses an optical signal on those optical paths to indicate unavailability and assigns itself to the time slot. In any case, it relinquishes control by impressing a signal on the control path.

DETAILED DESCRIPTION

Finding the optimal schedule for atomic multicasts in an asynchronous transfer mode (ATM) switch is inherently more difficult than finding the optimal schedule for unicasts or non-atomic multicasts. This conclusion is independent of technological constraints and is based on our discovery that scheduling atomic multicasts is equivalent to "coloring" the vertices of a contention graph derived from the requests for transmissions present at the beginning of each scheduling or transmission slot. The optimal scheduling solution finds the minimal number of colors required to color the vertices of the contention graph. Phrasing the problem in mathematical terms provides an understanding of how well the problem can be solved. Although an understanding of the mathematics of graph theory is not necessary for understanding the invention, its terminology is useful.

Figure 2:
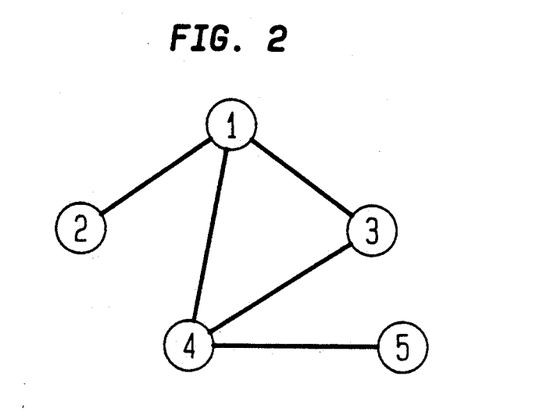
FIG. 2 is a contention graph for the switch and the exemplary set of transmission requests of FIG. 1.

A contention graph $G(V,E)$ illustrated schematically in FIG. 2 for the transmission requests shown for the switch of FIG. 1, is based on the identification of each vertex $v_i \in V$ of the graph, illustrated by circles with enclosed numbers, with an input port i. In the illustration, the vertices are labeled by the number of the corresponding input port in FIG. 1. The graph G is further defined by edges $(v_i,v_j) \in E$ between those vertices for which the corresponding input ports i and j request transmission to at least one common output port. That is, the edges identify input ports between which contention exists. The coloring problem assigns colors to all the vertices in such a way that no two vertices joined by an edge have the same color. This solution is equivalent to identifying the colors with different transmission time slots and requiring that contending transmissions to the same output port be assigned to different time slots.

A trivial solution to the coloring (scheduling) problem is to assign a different color (time slot) to each vertex (input port). That is, each of the input ports is given one of a sequence of time slots in which to transmit to whichever output ports it designates. However, it is preferable to reduce the number of time slots (colors) to a minimum. Nonetheless, it is well known that the minimal vertex-coloring problem is an NP-hard problem, as discussed by Garey et al. in "A List of NP-Complete Problems," *Computers and Intractability: A Guide to the Theory of NP-Completeness*, Freeman Press, 1979, p. 191. This result implies that obtaining the minimal coloring (optimal time scheduling) for arbitrary graphs is infeasible, and hence practical coloring (scheduling) can be expected at most to produce good but not always optimal solutions.

In view of the near impossibility of finding the optimal schedule, a heuristic vertex-coloring algorithm may be used which is implementable in hardware. This algorithm, illustrated in the flow diagram of FIG. 3 can be shown to use at most M+1 colors (transmission slots), where M is the maximum number of edges incident on any vertex of the contention graph, that is, M is the maximum number of different contentions existing at any input port. This algorithm relies on two variable arrays. The color or time-slot variable $Co_J$ is an integer indicating the time slot in which the J-th input slot is scheduled to transmit to all its chosen output ports. The state variable $St_J$ is a state of the J-th input port. An input port with nothing to transmit is inactive or INA. When it has something to transmit, it goes to the requesting state or REQ. When it has been assigned a slot, it assumes the assigned state or ASS. An input port is given a temporarily disabled state or DIS during the execution of the algorithm when it cannot be assigned to the current transmission slot because of contention. Of course, the state variable may be an integer variable.

Figure 3:
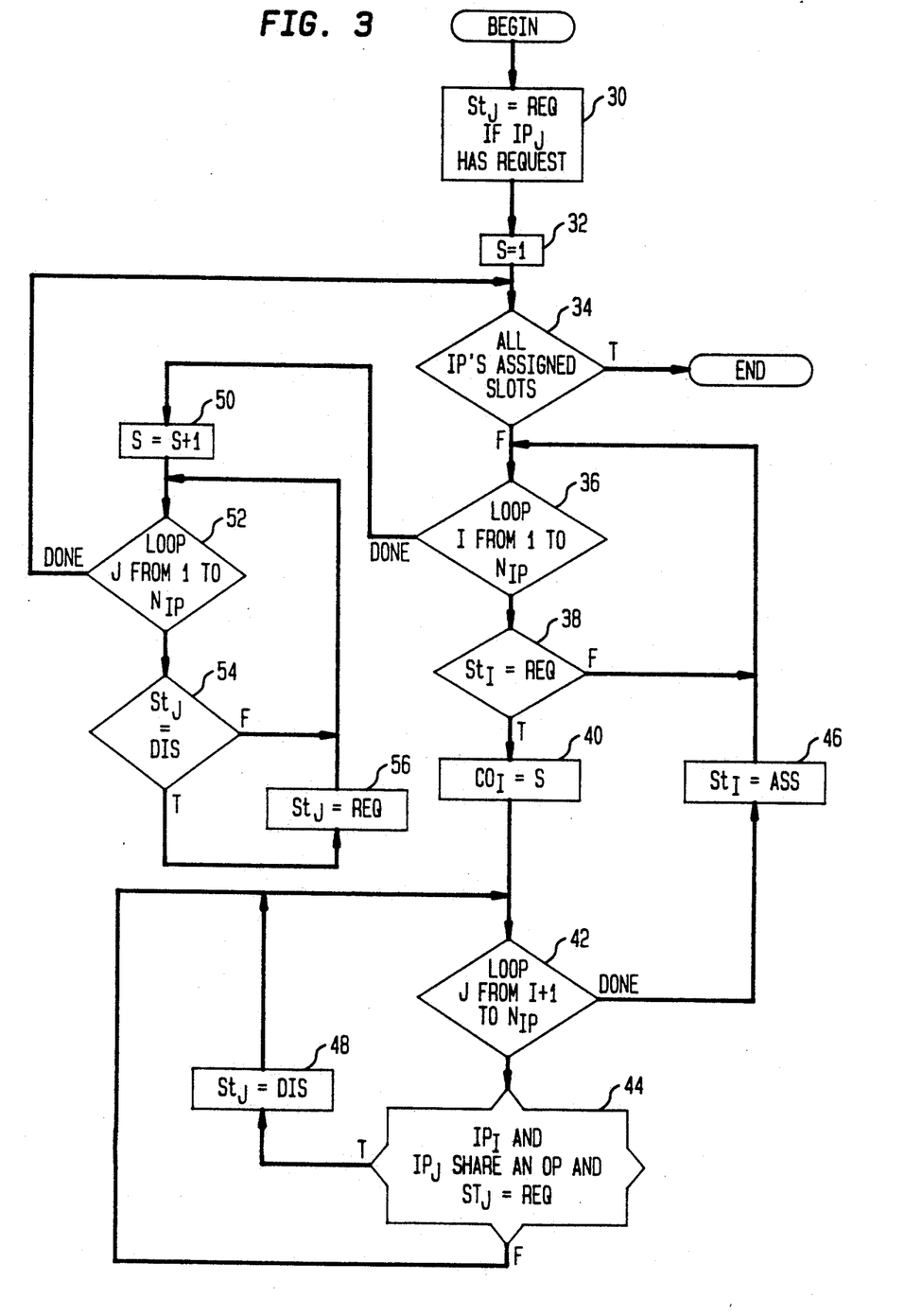
FIG. 3 is a flow diagram for scheduling atomic multicasts according to the present invention.

In the initial step 30 of the algorithm, all the input ports $IP_J$ are queried, and those containing a cell requesting transmission have their state variable $St_J$ changed to REQ. Otherwise the state variables are set to the inactive state INA. A coloring index S is set to its initial value of 1 in step 32. A control point 34 tests whether all input ports requesting a slot have been assigned such a slot, that is, whether all the state variables $St_J$ are either ASS or INA. If all the input ports have not been assigned, then an outer loop control 36 sets a loop variable I from 1 to the number $N_{IP}$ of input ports. In test 38, the state variable $St_J$ is tested. If that input port is not requesting transmission, then the outer loop control is re-executed. However, if that input port is requesting transmission, in step 40 the time-slot (color) variable $Co_J$ of that input port is assigned the time slot S, and thereafter an inner loop control 42 sets another loop variable J from (I+1) to the number of input ports, that is, to all input ports not already processed by the inner loop control 36 and assigned a slot. A test 44 determines if contention exists between the recently assigned input port and any other requesting input slot or, in the language of graph theory, whether an edge exists between the vertices I and J. This test 44 is accomplished by first determining if the state variable $St_J$ is REQ and then comparing the requested output ports for the transmission cells contained in the I-th and J-th input ports. If contention does exist for the J-th input port, then its state $St_I$ is disabled or DIS and remains so for the current time slot S being assigned.

Once all other input ports have been searched for contention, the inner loop control 42 is left and in step 46 the state $St_I$ is set to ASS, that is, it is noted that it has been assigned a time slot. Thereafter, control returns to the outer loop control 36. In a subsequent execution of the test 38 for the requesting state REQ, a disabled state DIS will prevent the time slot S being currently assigned from being assigned to a conflicting input port.

After outer loop control 34 determines that all input ports have been considered by its associated loop which tests whether they can fit without conflict within the current time slot S, it relinquishes control. In step 50, the time slot index S is incremented. Another loop control 52 cycles through all the input ports. If test 54 determines that an input port is disabled, that is, has a state $St_I$ set to DIS, then in step 56, the disabled state is reset to the requesting state REQ.

Thereafter, test 34 again determines if there are any remaining or unassigned requests that arose because of contention problems in previous time slots. If all requesting input ports have been assigned slots, then execution of the scheduling algorithm is terminated and transmission may begin. Time slots have been assigned to all requests that are at the top of their respective queues. If the algorithm were executed to its end, the number of time slots required would be $S-1$.

The algorithm is intended to be exemplary only and could be improved in a number of ways. Transmission could begin after each execution of the outer loop control 36. Once a cell in an input port has been assigned a transmission slot, in subsequent iterations of the outer loop control 36, another cell could be put into that input port to see if it could be transmitted without causing contention with cells with higher seniority. The entire algorithm can thus be considered as executing once each transmission slot with a periodic cycling of the slot index S.

Although the algorithm illustrated in FIG. 3 can be serially executed on a computer using a common programming language such as Pascal or C, it can advantageously be implemented in optical circuitry providing parallel operation at very high speeds. As illustrated in the schematic illustration of FIG. 4, a scheduler 60 for an N×M switch, that is, one having N input ports and M output ports, has M+1 waveguides, divided between an index waveguide 62 and M channel waveguides 64. Lasers 66 radiate light into each of the waveguides 62 and 64. The light propagating on the index waveguide 62 corresponds to the index I of the outer loop 36 of the coloring algorithm, while light propagating on the channel waveguides 64 will determine whether contention prevents a particular input port from transmitting to a particular output port in a time slot being considered. There are N sub-schedulers 68 corresponding to the input and receiving destinations requests from a respective input port (transfer register 18) over a respective query line 25-1, 25-2, . . . 25-N. Each sub-scheduler 68 controls M+1 nodes on the respective waveguides 62 and 64. Each node consists of a serial arrangement of first an optical detector 70 detecting a small portion of light tapped off the associated waveguide 62 or 64 and which is connected to the associated sub-scheduler 68 by an electrical line 71. Each node consists secondly of an optical gate 72 which controls the passage of light through the waveguide 62 or 64 and which is connected to the associated sub-scheduler 68 by another electrical line 73. In the ON state, the gate passes all light to further on the waveguide 62 or 64; in the OFF state, it blocks all light at that point.

Figure 5:
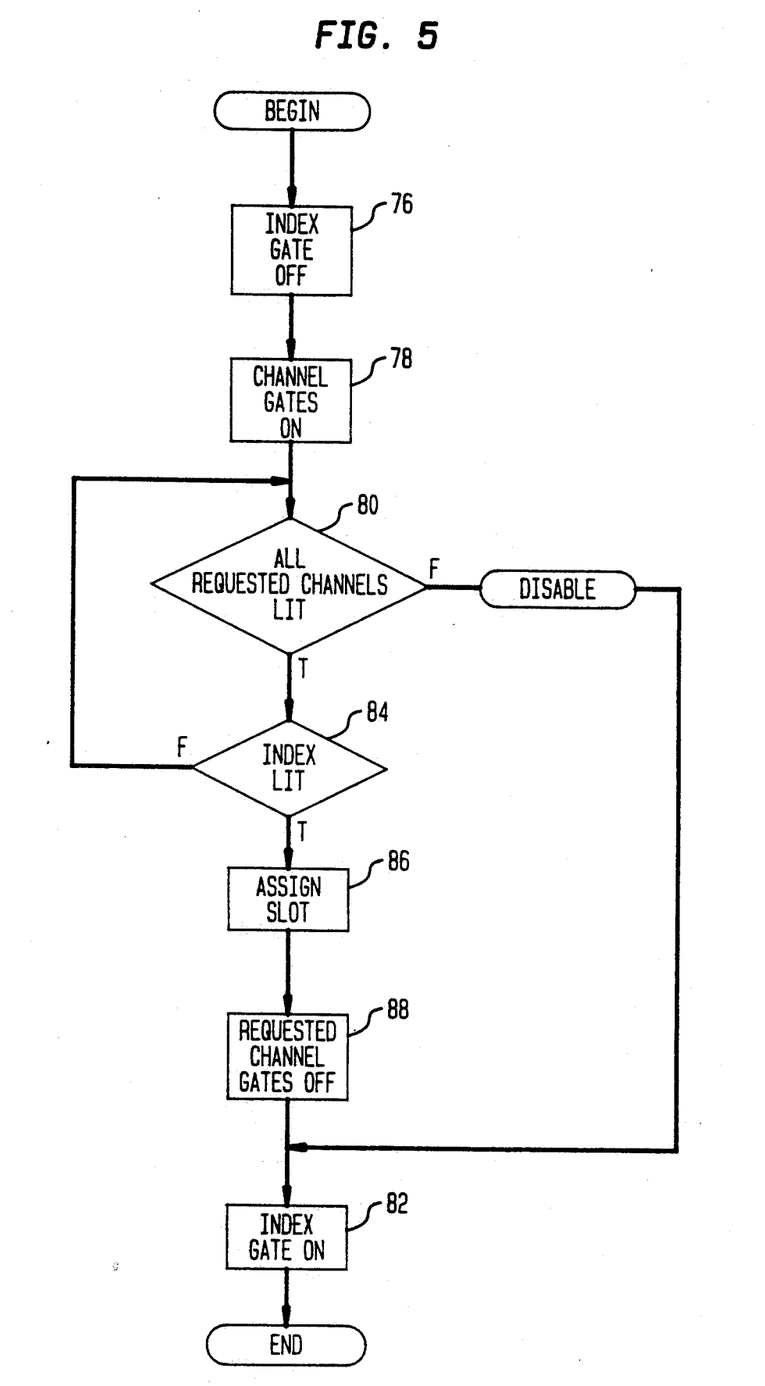
FIG. 5 is a flow diagram for an operation of a portion of the scheduler of FIG. 4.

Each of the sub-schedulers 68 executes an algorithm illustrated in the flow diagram of FIG. 5. This flow diagram executes once for each transmission slot and thus corresponds to the slot loop 34 of the coloring algorithm. In step 76, the sub-scheduler 68 initially sets the optical gate 72 that it controls on the index waveguide 62 to the OFF state, and in step 78 it sets all the optical gates 72 on the channel waveguides 64 to the ON state. In test 80, it determines if the optical detectors 70 on all the channel waveguides 64 corresponding to the desired output ports are detecting light, that is, are all requested channels lit, and therefore are all requested output ports available. If all the requested channels are not available, then the sub-scheduler disables itself for the remainder of the present assignment slot and in step 82 turns on its optical gate 72 on the index waveguide 62 so that other sub-schedulers 68 down the line can take control. If the requested channels are all available, in step 84, it determines if its photo-detector 70 on the index waveguide 52 is detecting light. If it is not, then execution loops back through tests 80 and 84 until both conditions are satisfied.

If its photo-detector 70 is lit, so that it is now this sub-scheduler's 68 turn to assign, in step 86, it assigns itself to the time slot now being allocated. In step 88, it turns off the optical gates 72 on all the channel waveguides 64 corresponding to the output ports it requested and has now assigned itself, thereby blocking any other sub-schedulers 68 for assigning themselves to these output ports. Finally, in step 82, it turns on its optical gate on the index waveguide 62, thereby passing control down the line.

Although the execution of only one sub-scheduler 68 is being described, all the sub-schedulers 68 are identically programmed, and all may be executing in parallel the algorithm of FIG. 5. The sub-schedulers 68 not enabled by the index waveguide 62 are mostly looping through test 80 and 84. Once any sub-scheduler 68 detects in tests 80 that its requests cannot be satisfied, it skips steps 86 and 88 and drops out for the current assignment cycle. Therefore, the number of steps which must be sequentially executed by the N sub-schedulers 68 is minimized.

In a tightly controlled scheduler, a master scheduler receives notice of the assignment, if any, of the sub-scheduler 68, and also notes which of the N sub-schedulers 68 have ended execution. When they have all ended and some of them still have not been assigned time slots, it increments the slot index S and restarts execution of the sub-scheduler algorithms. On the subsequent iterations, it is possible that the master scheduler reassigns untransmitted cells to sub-schedulers 68 further up the line so that cells are eventually guaranteed transmission.

In this tightly controlled scheduler, the sub-scheduler algorithm of FIG. 5 is executed sequentially for the N sub-schedulers 68. If the time required for the successful execution of steps 80, 84, 86, 88, and 82 is a time $\delta$, then the total time required to schedule all N inputs is $N\delta$.

However, the scheduler is preferably configured to be more loosely controlled such that all the sub-schedulers are simultaneously operating their algorithms. Only the sub-scheduler whose index detector is lit (and which has not yet turned on its index gate) may assign itself a slot and block the channels it desires. Such loose control decreases the time needed for assigning most combinations of connection requests but causes loss of synchronous operation of the scheduler since the total scheduling time depends on the specific set of requested connections. A separate index detector needs to be positioned at the end of the index channel to indicate that a cycle has been completed.

Figure 4:
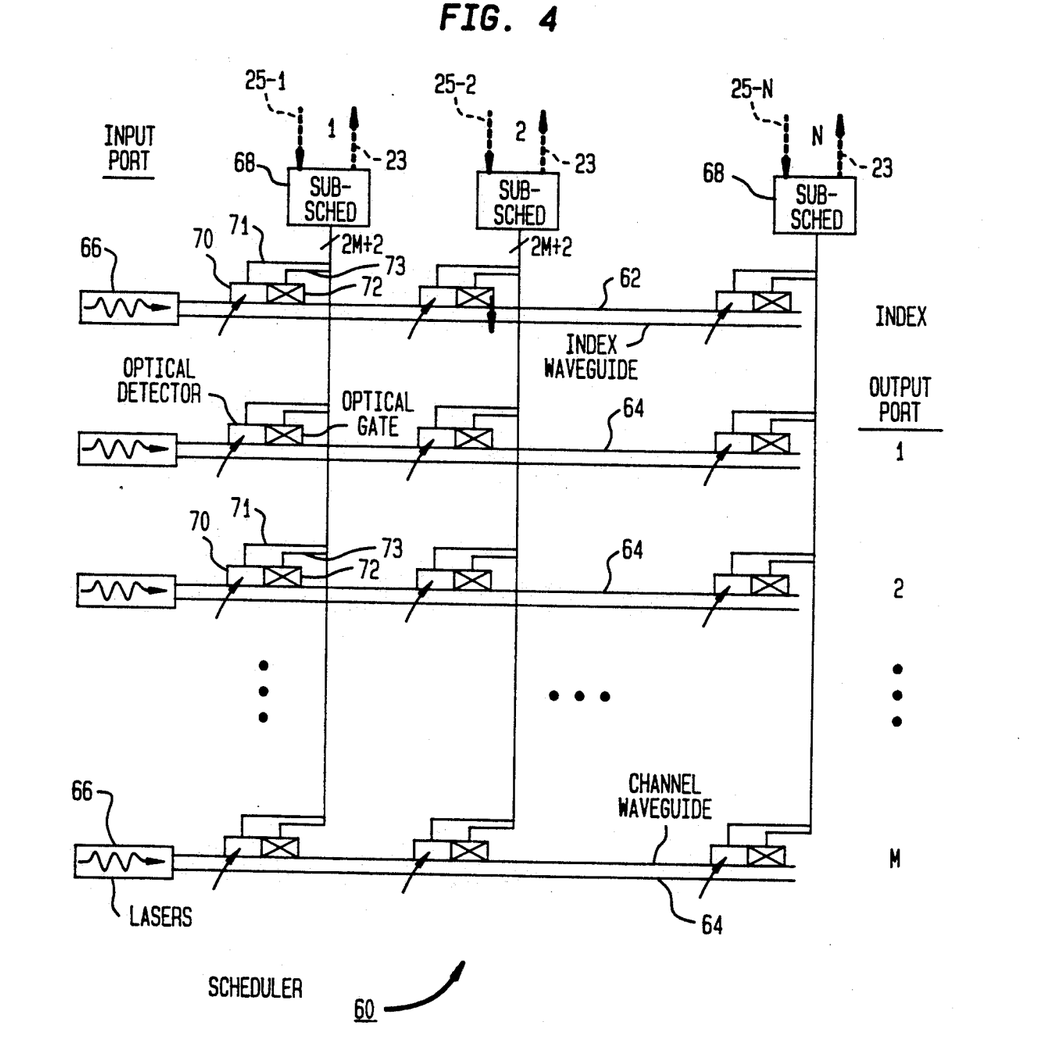
FIG. 4 is a schematic diagram of a first optical implementation of the flow diagram of FIG. 3.
Figure 6:
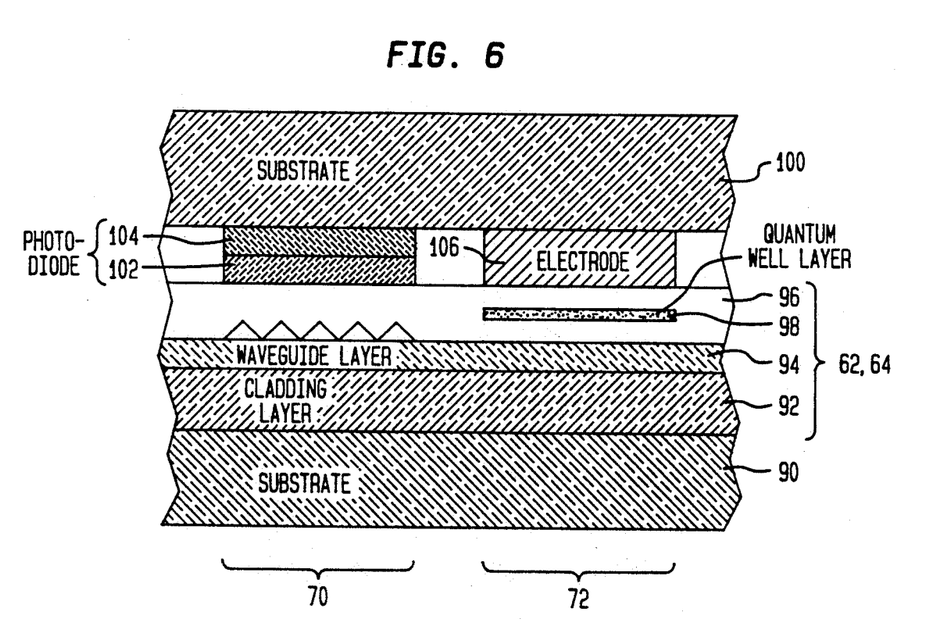
FIG. 6 is a cross-sectional illustration of a portion of FIG. 4.

The optical detectors and gates of FIG. 4 may be fabricated as shown in cross-sectional view in FIG. 6 for one node. On a first substrate 90 are formed a lower cladding layer 92, a waveguide layer 94, and an upper cladding layer 96, together forming the index or channel waveguide 62 or 64. However, in the area of the optical detector 70, the upper cladding layer 96 is patterned into a Bragg diffraction grating so that part of the light on the waveguide 62 or 64 is diffracted upwardly. An electro-modulator is formed in the area of the optical gate 72 by placing a quantum-well layer 98 in the upper cladding layer 96. Different bias voltages applied vertically across the quantum-well layer 98 vary the effective refractive index in that portion of the upper cladding layer 96 such that it alternately confines light to the waveguiding layer 94 or leaks light from it. A second substrate 100 is flip-chip mounted to the first substrate 90. On its active surface is formed a p-type region 102 and an n-type region 104, thus forming a PIN photo-diode, and an electrode 106 for controlling the electro-absorbing modulator. Counter electrodes on the first substrate 90 are not illustrated.

Figure 7:
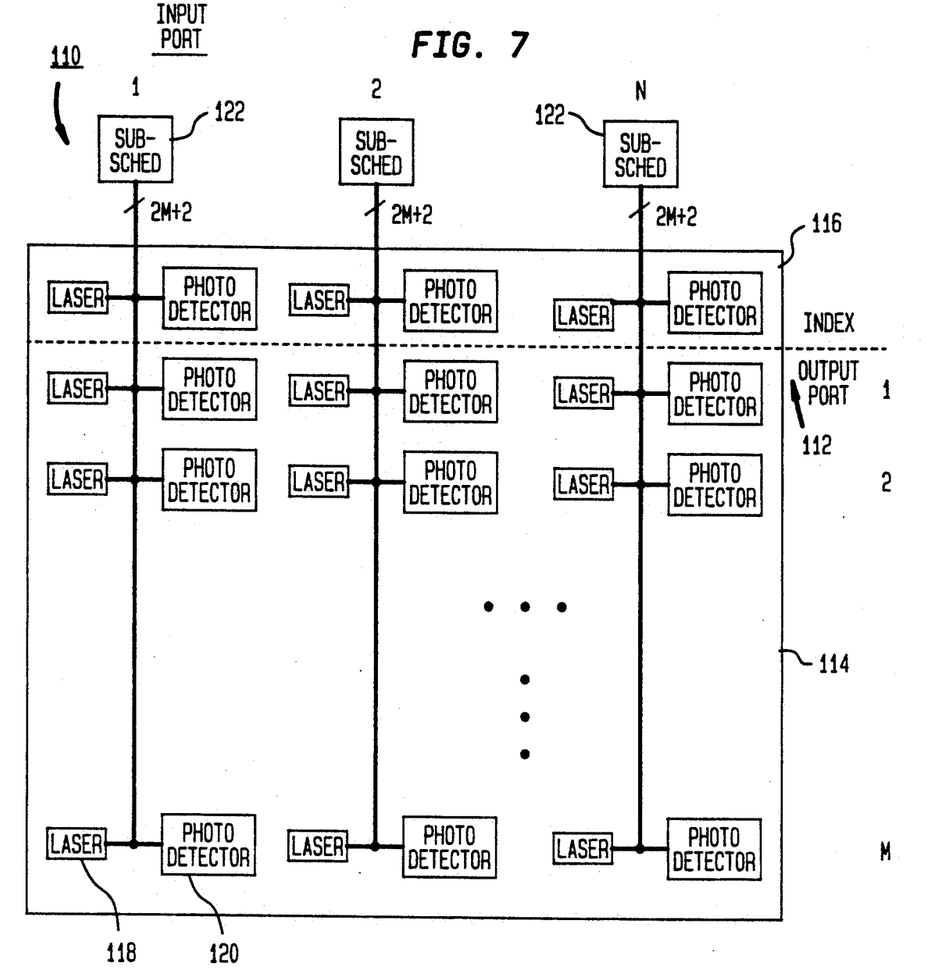
FIG. 7 is a schematic illustration partially in plan view of a second optical implementation of the flow diagram of FIG. 3.
Figure 8:
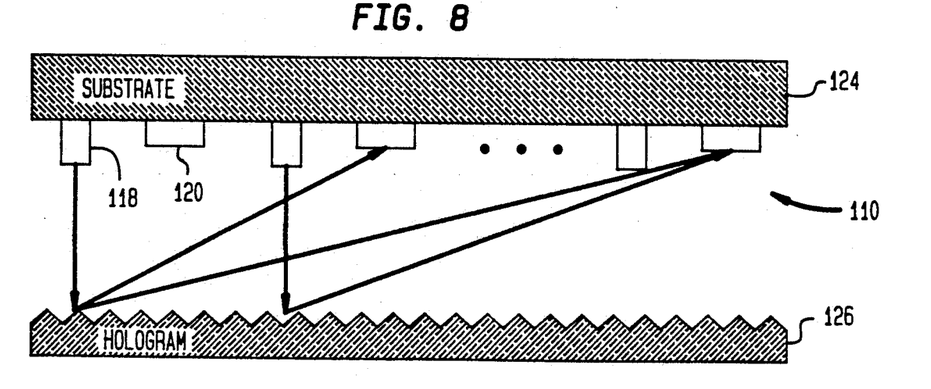
FIG. 8 is cross-sectional illustration including a portion of FIG. 7.

Another optical implementation of the scheduler using laser arrays is illustrated schematically in plan view in FIG. 7. A scheduler 110 controlling a switch having N input ports and M output ports has a transceiver array 112 divided into an $M \times N$ channel section 114 and a $1 \times N$ index section 116. A surface-emitting laser 118 and a photo-detector or receiver 120 are located at each node of the array 112. The laser array can be fabricated on a substrate 124, as illustrated in the cross-sectional view of FIG. 8, according to the procedure disclosed by Orenstein et al. in U.S. Pat. No. 5,031,187. Photo-detectors can be easily included in the fabrication of the laser array. The elements of the transceiver array 112 are interconnected by a passive optical interconnect, such as a hologram 126 such that a laser 118 irradiates only those receivers located further down the line (to the right in FIGS. 7 and 8) in its own row. That is, in the index section 116, let $L_i$ and $R_i$ denote the i-th laser 118 and receiver 120 respectively. Then, the laser $L_i$ will irradiate only the receivers $R_{i+1}, R_{i+2}, \ldots R_N$. Similarly, in the channel section 114, let $L_{i,j}$ and $R_{i,j}$ represent the laser 118 and receiver 120 at the node of the i-th row and j-th column. Then the laser $L_{ij}$ will irradiate only the receivers $R_{i,j+1}, R_{i,j+2}, \ldots R_{i,N}$.

Sub-schedulers 122 associated with the respective input ports control the lasers 118 and receive signals from the receivers 120 in the respective columns of the array 112. The index section 116 is used to implement the request array and the inner loop index variable I in the coloring algorithm. The channel section 114 is used, once an input port has assigned itself a time slot, to prevent conflicting input ports from assigning themselves the same time slot. The receivers 120 in each row detect contention for the output port associated with that row.

Initially in an assignment cycle, all lasers 118 in the channel section 114 are turned off and all lasers 118 in the index section 116 are turned on. Hence, initially, only the first receiver $R_1$ in the index section 116 is not illuminated. The lack of illumination indicates to the first sub-scheduler 122 that its turn to assign has occurred. It then checks whether the receivers 120 associated with all the desired output ports are not illuminated. If so, all the desired output ports are available, and the sub-scheduler 122 turns on the corresponding lasers 118, assigns itself to the slot, and turns off its laser 118 in the index section 116. On the other hand, if any of the receivers 120 associated with the desired output ports are illuminated, contention exists and the sub-scheduler 122 disables itself and passes control without assigning itself the slot by turning off its laser 118 in the index section 116. All sub-schedulers 122 may in parallel be checking whether contention exists for their desired output ports, and once they have discovered contention, they relinquish control even before they have gained it. Once the first sub-scheduler 122 has finished, the process repeats itself sequentially in the sub-schedulers 122 until all input ports needing transmissions slots are either disabled or have assigned themselves to the current slot.

The generalizable optical interconnect allows the nodes to be arranged in a physical arrangement having no strict correlation with the logical arrangement shown in FIG. 7. That is, the illustrated rows and columns should be interpreted as a logical array in which light paths are established along the rows and the sub-schedulers exert control along the columns.

Termination detection in a loosely controlled asynchronous system may be implemented with an additional $1 \times N$ termination section in the transceiver array 112. The optical interconnection within the termination section is a star coupler such that every laser irradiates all other receivers. When a sub-scheduler 112 has either assigned itself the current slot or disabled itself for the current slot, it turns off its termination laser. Only when its termination detector no longer detects illumination has the current assignment cycle been completed so that the sub-scheduler 122 may remove its disablement.

Figure 9:
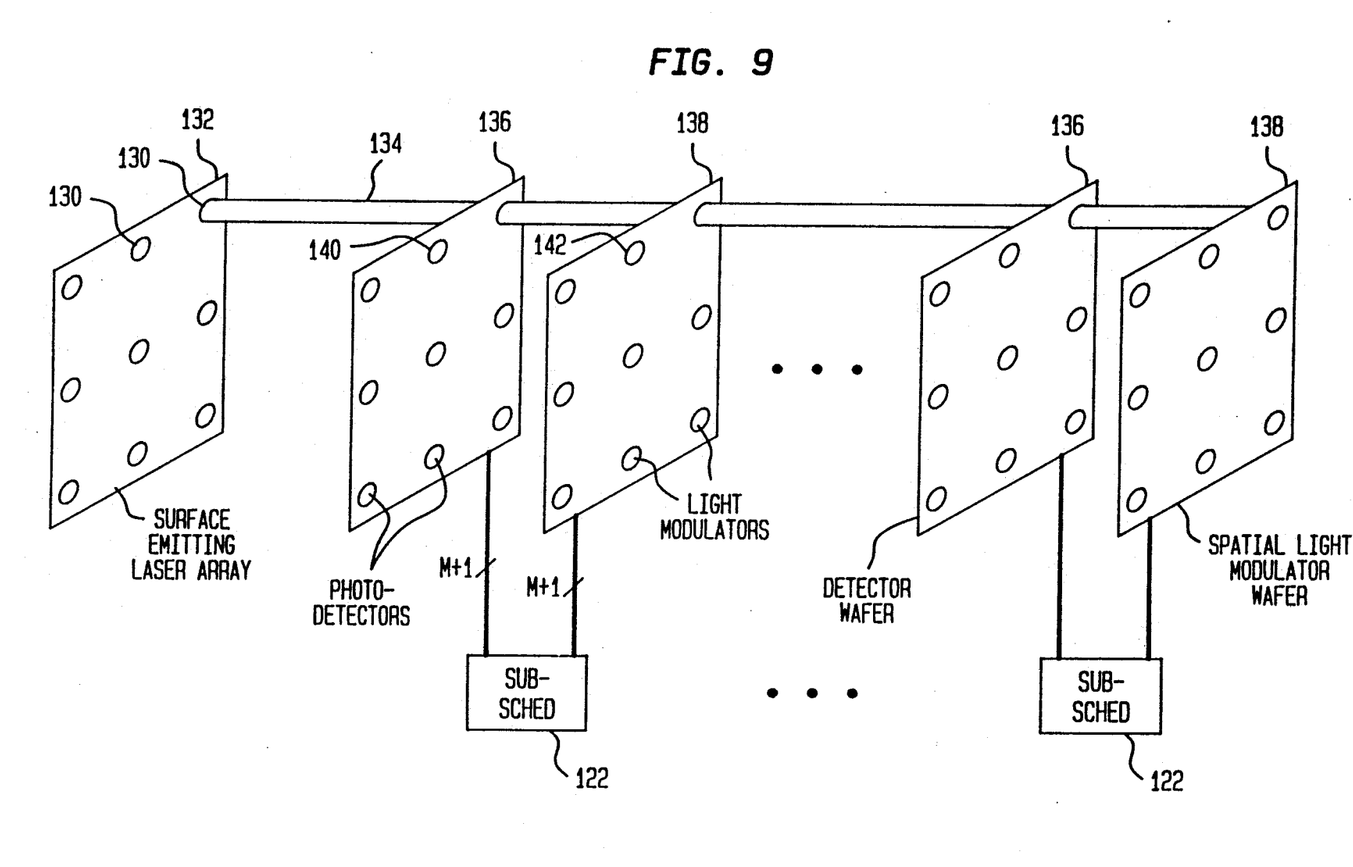
FIG. 9 is a schematic illustration of a third optical implementation of the flow diagram of FIG. 3.

Yet a third optical implementation of the scheduler is illustrated schematically in FIG. 9. A two-dimensional array of surface-emitting lasers 130 is fabricated on one wafer 132. The figure shows a $3 \times 3$ array, for which $M=8$. Each laser 130 is integrated with an associated micro-lens, as has been disclosed by Rastani in U.S. Pat. No. 5,073,041, so as to produce a well collimated beam 134. One of the beams 134 defines an index beam while the remaining beams 134 define the M channel beams. A detector wafer 136 and a spatial light modulator wafer 138 are electrically connected to and associated with each of the N sub-schedulers 122, and they are aligned so that each beam 134 first passes through one of the array of transparent photo-detectors 140 and then through one of the array of light modulators 142 for each of the N sub-schedulers 122. The transparent photo-detectors 140 can be built following the procedure described by Hamanaka et al. in "Optical bus interconnection system using Selfoc lenses," *Optics Letters*, volume 16, 1991, pp. 1222–1224. The operation of this embodiment is very similar to that of the embodiment of FIG. 4.

Priorities may advantageously be attached to requests from input ports in order, for example, to ensure fairness and avoid starvation in a heavily congested situation. To provide p priority levels for N input ports for the waveguide embodiment of FIG. 4, there should be pN sub-schedulers or at least pN columns of nodes. All high-priority nodes are located upstream (to the left)

from lower-priority nodes. A sub-scheduler will control all its nodes regardless of priority but will attempt to assign itself only via the nodes of correct priority. Therefore, only after all high-priority requests have been satisfied will a lower-priority request be accepted. A sub-scheduler could increase its priority if it has not been able to assign itself with a lower priority. Similar prioritization schemes can be applied to the other embodiments.

Non-atomic multicasts can be handled by any of the embodiments by allowing a sub-scheduler to assign itself to the current time slot even if a partial conflict exists. However, it would assign only the cell only to the non-conflicting output ports and would attempt in the next time slot to assign to the now conflicting output ports. Of course, unicasts are a special case of atomic multicast in which only a single output port is requested and may be handled in the described algorithms and hardware.

Accordingly, the invention provides for the quick and nearly as optimal solution as possible for the scheduling of atomic multicasts in an ATM switch. Within present technology, schedulers should be able to handle as many as 128 inputs and 1024 outputs. The parallelism provided by the optical implementations allows a speedy resolution of contention.

What is claimed is:

1. A switch including N input ports, M output ports, a switching portion connecting selected ones of said input ports to selected ones of said output ports, and an optical scheduler for assigning said M output ports to said N input ports, said scheduler comprising:
   N optical channels;
   N light sources inputting light to light input sides of respective ones of said N optical channels;
   M×N pairs of an optical detector and an optical gate, M of said pairs being operatively arranged along a respective one of said optical channels from said light input side thereof to a light output side thereof; and
   N sub-scheduling circuitries, each:
      associated with and receiving a request signal from a respective one of said input ports indicating a request for a connection through said switch to one or more of said output ports,
      receiving control signals from respective ones of said detectors arranged along each of said optical channels indicating an availability of requested output ports, and
      controlling a switching portion of said switch in response to said request signal and said control signals.

2. A switch as recited in claim 1, wherein said optical scheduler further comprises:
   an N+1-st optical channel;
   an N+1-st light source inputting light to a light input side of said N+1-st optical channel; and
   N pairs of an optical detector and an optical gate operatively arranged along said N+1-st optical channel from said light input side thereof to a light output side thereof;
   wherein each said sub-scheduling circuitry must detect a signal of a predetermined state on a respective one of said optical detectors arranged on said N+1-st optical channel before it controls said switching portion of said switch.

3. An optical scheduler as recited in claim 2, wherein each said sub-scheduling circuitry modulates optical signals on said N+1 optical channels.

4. An optical scheduler as recited in claim 1, wherein each said optical channel comprises an optical waveguide.

5. An optical scheduler as recited in claim 1, wherein each said light source produces a collimated beam and N said optical detectors and N said optical gates are arranged along said beam.

6. An optical scheduler for assigning M output ports to N input ports in a switch, said scheduler comprising:
   M first groups of at least (N−1) light sources, each said group being arranged from a first side to a second side;
   a passive optical coupler;
   M second groups of at least (N−1) optical detectors, each said second group arranged in correspondence to said first group, each optical detector in each said second group receiving optical signals through said passive optical coupler from all of said light sources in the corresponding first group on the first side of said each optical detector; and
   N sub-scheduling circuitries, each:
      associated with and receiving a request signal from a respective one of said input ports indicating a request for a connection through said switch to one or more of said output ports,
      receiving control signals from respective ones of said detectors within each of said second groups indicating an availability of requested output ports, and
      controlling a switching portion of said switch in response to said request signal and said control signals.

7. An optical scheduler as recited in claim 6, further comprising:
   an M+1-st first group of at least (N−1) light sources arranged from said first side to said second side; and
   an M+1-st second group of at least (N−1) optical detectors arranged in corresponded to said M+1-st first group and receiving optical signals through said passive optical coupler from all of said light sources in said M+1-st first group arranged on the first side of the receiving optical detector; and
   wherein each sub-scheduling circuitry must detect a signal of a predetermined state on a respective one of said optical detectors in said M+1-st second group before it controls said switching portion of said switch.

8. In a switch having a switching fabric switching data from N input ports M output ports and an optical scheduler for assigning said M output ports to said N input ports, the optical scheduler comprising:
   M light sources;
   an optical channel fabric having M optical paths respectively receiving light from said M light sources; and
   N sub-scheduling systems each comprising M photo-detectors and M light modulators and a sub-scheduling controller receiving first electrical signals from said M photo-detectors and a second electrical signal from one of said input ports, controlling a light output of said M light modulators, and providing an electrical signal for a configuration of said switching fabric;

wherein each said optical path passes through a respective one of said photo-detectors and a respective one of said light modulators in each of said sub-scheduling systems.

9. The optical scheduler recited in claim 8, further comprising an M+1-st light source and wherein each of said N sub-scheduling systems further comprises an M+1-st photo-detector and an M+1-st light modulator and said sub-scheduling controller receives a signal from said M+1-st photo-detector and controls a light output of said M+1-st modulator and wherein said optical fabric has an M+1-st optical path receiving light from said M+1-st light source and passing through said M+1-st photo-detector and said M+1-st light modulator of each of said N sub-scheduling systems.

10. The optical scheduler recited in claim 9, wherein all said N sub-scheduling systems are executing in parallel replicated programs of an algorithm.

11. An optical method for scheduling switch connections between a plurality of input ports and a plurality of output ports, comprising the steps of:
a first step of receiving a permission signal indicating permission to assign a time slot to one of a plurality of input ports;
a second step of receiving from said one input port a request for assigning a plurality of output ports for said one input port to be connected to;
a third step of detecting a plurality of optical connection signals corresponding to said plurality of output ports requested to be connected to said input port;
assigning said input port to said time slot in respose to said detected optical connection signals that were detected after said permission signal has been received; and
sending after said assigning step a relinquishment signal indicating relinquishment of said permission.

12. A method as recited in claim 11, wherein said permission signal is a first two-state optical signal and said relinquishment signal is a second two-state optical signal, wherein said receiving step comprises a second step of detecting said first two-state optical signal and wherein said sending step comprises a step of transmitting said second two-state signal.

13. A method as recited in claim 12, wherein said third step of detecting includes a fourth step of detecting said plurality of optical connection signals before said permission signal has been received and a fifth step of detecting said plurality of optical connection signals after said permission signal has been received and further comprising a step of disabling said input port in response to said plurality of optical signals detected before said permission signal has been received.

14. An optical method for scheduling switch connections for a plurality of input ports as recited in claim 13, wherein said third detecting step is being performed in parallel for more than one of said input ports.

15. An optical scheduler as recited in claim 4, wherein said optical waveguides are formed in a substrate.

16. An optical scheduler as recited in claim 5, wherein M of said optical gates are formed in each of N substrates.

17. An optical scheduler as recited in claim 1, wherein said sub-scheduling circuitries are capable of controlling said switching portion of said switch to allow a plurality of input ports to be connected to respective pluralities of output ports.

18. An optical scheduler as recited in claim 6, wherein said light sources are surface-emitting lasers.

19. An optical scheduler as recited in claim 18, wherein said passive optical coupler comprises a hologram.

* * * * *